Dec. 12, 1944. P. ZALKIND 2,364,765
CONTAINER AND PARTS THEREOF
Filed May 22, 1939 3 Sheets-Sheet 1
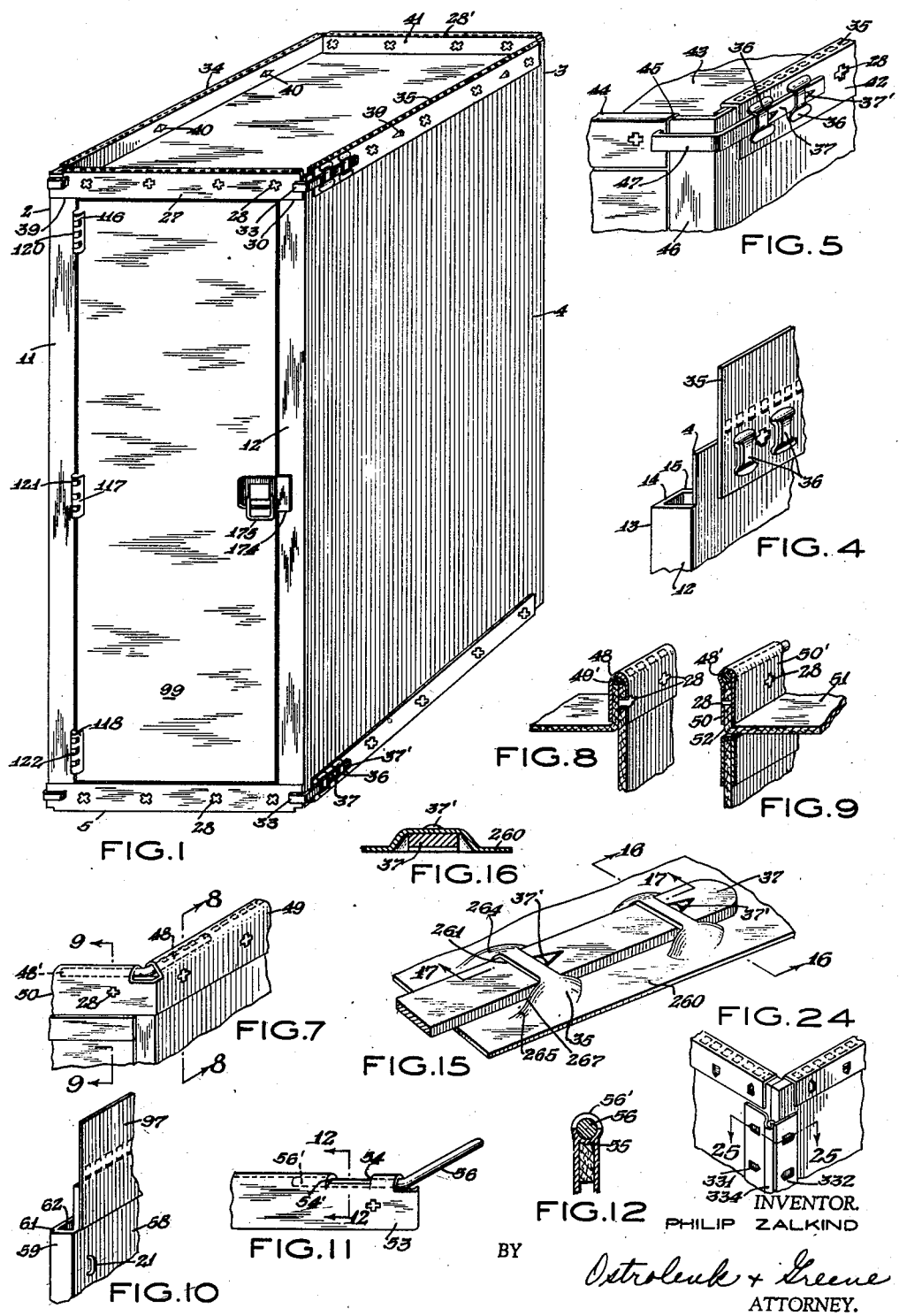
INVENTOR.
PHILIP ZALKIND
BY Ostrolenk + Greene
ATTORNEY.

Dec. 12, 1944.                P. ZALKIND                2,364,765
                      CONTAINER AND PARTS THEREOF
                      Filed May 22, 1939          3 Sheets-Sheet 2
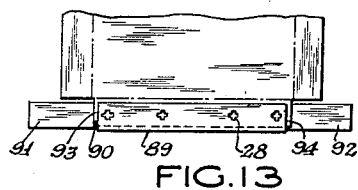
FIG.13
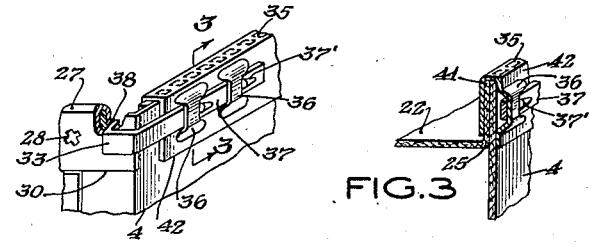
FIG.2
FIG.3
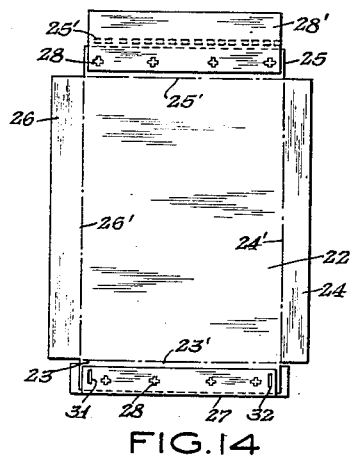
FIG.14
FIG.32
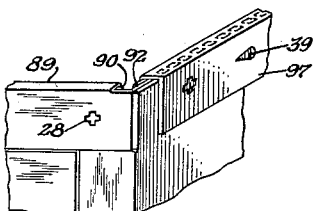
FIG.6
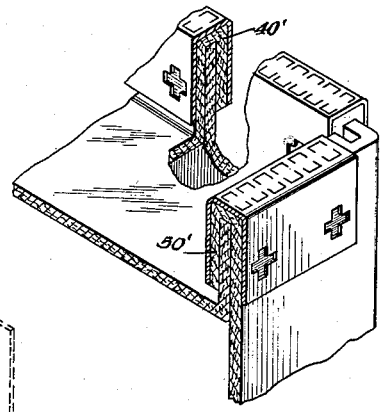
FIG.29
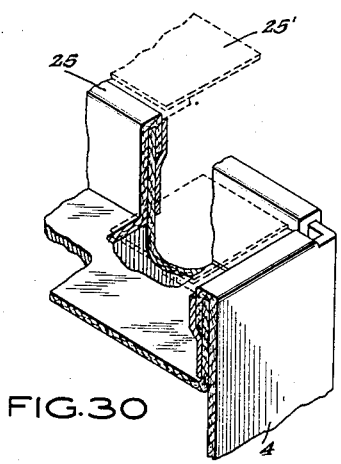
FIG.30
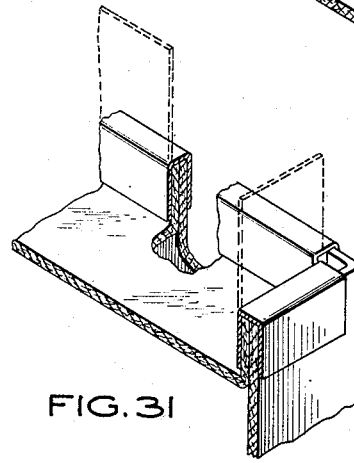
FIG.31
INVENTOR.
PHILIP ZALKIND
BY  Ostrolenk + Greene
              ATTORNEY.

Dec. 12, 1944.                P. ZALKIND                2,364,765
                        CONTAINER AND PARTS THEREOF
                        Filed May 22, 1939           3 Sheets-Sheet 3

INVENTOR.
PHILIP ZALKIND
BY Ostrolenk & Greene
ATTORNEY.

Patented Dec. 12, 1944

2,364,765

UNITED STATES PATENT OFFICE 2,364,765

CONTAINER AND PARTS THEREOF

Philip Zalkind, New York, N. Y.

Application May 22, 1939, Serial No. 275,035

1 Claim. (Cl. 229—23)

My invention is a continuation-in-part of my application Serial No. 739,962, filed August 15, 1934, Patent No. 2,159,069, issued May 23, 1939, and relates to containers and more particularly to cabinets, chests, file casings and parts therefor.

Numerous attempts have been made to develop collapsible cabinets made of sheet and/or fibrous material such as plaster board, panel board, corrugated board, container board, fiber board, etc., which can be used for storage of clothing and the like.

Many of such devices have been proven by scientific tests imperfect and inefficient for their stated purposes, such as a moth proof cabinet, for which purpose hermetic tightness is required.

Accordingly, an object of my invention is to provide a novel construction of collapsible cabinets made of fibrous and/or other material, such as an impervious substance which may be collasped for shipment; which will provide a sufficient seal to effectually retain and prevent the escape of an insecticide, repellent, or extermination gas placed therein; which will exclude air and/or moisture; which has ruggedness to withstand the wear and tear in inserting and removing articles; has a pleasing appearance; and is inexpensive.

There are numerous other objects of my invention which will become evident in the course of the detailed description which follows in connection with the drawings in which:

Figure 1 is a perspective view of the cabinet;

Figure 2 is a perspective fragmentary view of the front upper corner of the cabinet, showing a U-shape metal clamp used for securing the side walls of the cabinet with the front edge or face of the end wall member and reinforcing the joint at the corners;

Figure 3 is a vertical section in perspective on line 3—3 of Figure 2;

Figure 4 is a fragmentary view in perspective of the upper front corner of the cabinet, with top and U-shape clamp removed, showing the metal strip before being bent in;

Figure 5 is a view similar to that of Figure 2 showing a modified construction of cabinet;

Figure 6 is a view similar to that of Figure 2 showing another modified construction of the cabinet;

Figure 7 is a view similar to that of Figure 2 showing a further modification of reinforcing corners;

Figure 8 is a vertical cross-section in perspective on line 8—8 of Figure 7;

Figure 9 is a vertical section in perspective on line 9—9 of Figure 7;

Figure 10 is a view similar to that of Figure 4 showing a modified form of the construction of the cabinet;

Figure 11 is a fragmentary view in perspective of the upper cross member in front of the cabinet showing a modified means for securing in place the corner reinforcing wire;

Figure 12 is a vertical section on line 12—12 of Figure 11;

Figure 13 is a plan view of a portion of the top or bottom member of the cabinet of Figure 1 in developed form;

Figure 14 is a view similar to that of Figure 13 showing the entire blank in a modified form;

Figure 15 is a detail of the member 33 of Figure 5 for rigidly securing two walls at right angles to each other in fixed position with relation to each other;

Figure 16 is a cross section through 16—16 of Figure 15;

Figure 24 is a perspective view of one corner of a cabinet structure similar to that shown in Figure 21 with a modified form of hinge for interlocking the side walls;

Figure 29 is a perspective view of a modification of Figure 14;

Figures 30 and 31 are perspective views of further modifications of Figure 14;

Figure 32 is a detail of a modification of Figure 2; and

Figure 17:
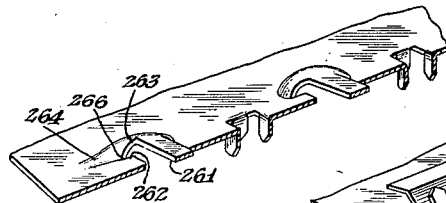
Figure 17 is a cross section through 17—17 of Figure 15.

Referring now to Figure 1, I have here shown a collapsible cabinet of the type more fully described in my application Serial No. 739,962 above mentioned and comprising side walls 4, 4 hingedly connected to a rear wall along fold lines 3, front reinforcements 11, 12 (described in application Serial No. 739,962, and also in application Serial No. 252,853), carrying hinges 116—120, 117—121, 118—122 and a door 99 (also described in my copending application Serial Nos. 739,962, 234,405 and 257,697).

The top and bottom portions of the cabinet comprise sunken end members such as described in my application Serial No. 693,841, filed October 16, 1933, of which this application is a continuation in part, and as also described in my application Ser. No. 61,858. Such a member is shown in detail in Figure 14 and consists of a main section 22 with flap extensions 23, 24, 25 and 26. The front and back edges of this member, defined by the score lines 23' and 25', and the sides, defined by the score lines 24' and 26', have dimensions corresponding to the widths of sections 3, 2 and 4 respectively of the blank of Figure 1, so that when the flaps 23 to 26 are turned on their respective score lines at right angles to the plane of section 22, this section will fit into the top and bottom of the cabinet.

Secured to the flap 25 is a metallic member 28' having a grid work 25'', the details of which are described in the copending application referred to above. This grid work consists mainly of perforations or slots formed along a line in the metal to predetermine a bending line about which the metal tends to bend when pressure is applied to the outer edge of the metal section.

As described in that copending application, the metal member is also secured to the tongue 25 by prongs 28 which are stamped out of the metal and substantially at right angles thereto. Secured as by prongs 28 punched from the metal to the second tongue 23 is a second metallic member 27 and having a similar grid work to permit the metal to be bent into a U shape about the edge of the tongue and encasing the tongue as shown in Figure 1.

The extensions 91 and 92 of Figure 13 may protrude from the portion of the metal in contact with the front surface of the tongue; the purpose of these will be described in more detail hereinafter.

Transverse slots 31 and 32 (Figure 14) may be provided near the outer ends of flap 23 and metal member 27 and extending through from the outer to the inner side, to form a socket for a locking member securing the side and end walls in assembled position, as will be shown hereinafter.

After the blank of Figure 1, with the posts formed as described above, has been turned on its score lines to form the side and back walls, the sunken end member 22 (Figure 14) is slipped into place at the top with the tongues 24 and 26 at right angles to main section 22 and in face-to-face relation with the side walls, and on the sides opposite the metal members 34 and 35 (Figure 1).

Members 34 and 35, made of metal, are secured near the upper edges of members 2 and 4 (Figure 1) by means of prongs punched out of the metal, and have a grid work of perforations forming a bending line along the upper edge of the two sections 2 and 4, to permit these members to be turned into U or channel shaped members.

Obviously, the spacing in the grid work for the metal strip 28' secured to the rear flap 25 is regulated in accordance with the thickness of the material to be encased by the metal when bent into a U. Thus, the front cross member 44 in bending over, engages the flange of the insert end or top wall 43 in the manner described in my application Serial No. 739,962 and Ser. No. 61,858.

When the sunken end member of Figure 14 has been inserted in place, the metal members 34 and 35 are bent inwardly about their score lines until they engage the inner surface of flaps 26 and 24 respectively to secure the sunken end member 22 to the cabinet body.

It will be noted that the width of tongues 24 and 26 correspond to the width of the material cut away at the corner sections 2 and 4 to form the tongues 29 and 30. Accordingly, when the sunken end member 22 is mounted in place and the metallic members 34 and 35 are turned about their score lines, member 22 is engaged by the turned in edges of members 34 and 35 and is firmly seated thereby on the posts formed by members 29 and 30. In order to further secure the end 22 in place, metallic member 28' is now turned about its grid work until it engages the outer surface of the back wall 3.

Figure 23:
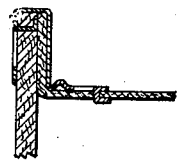
Figure 23 is a cross section through 23—23 of Figure 21.
Figure 22:
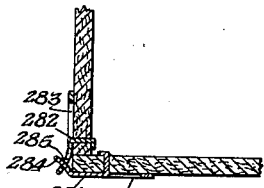
Figure 22 is a cross section through 22—22 of Figure 21.
Figure 21:
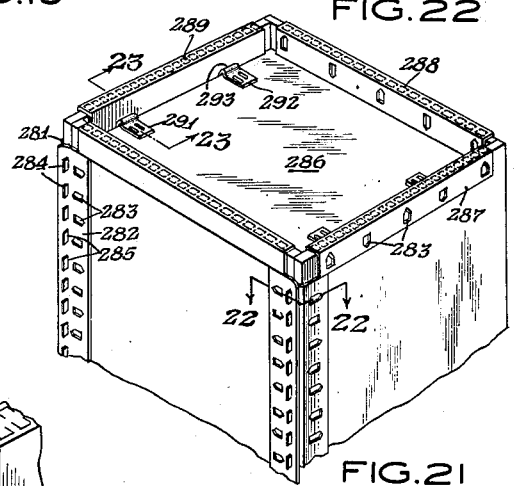
Figure 21 is a perspective view of a novel modified form of cabinet in which each of the walls is a separable member arranged to be interlocked and connected with adjacent walls by means of novel hinge structures.

In Figures 21, 22 and 23 I have shown a form of cabinet in which each of the walls is preferably a separate and separable unit consisting of a rigid material such as metal ply board. They are normally disengaged from each other but may be interlocked to form an upright and rigid cabinet by means of interlocking members of metal such as 281 and 282, secured along the edges of the walls by means of prongs punched from the metal, as shown at 283. Member 281 is provided with protruding curved prongs 284 and the member 282 is provided with slots 285, shown in exaggerated size for purposes of clarity. Curved prongs 284 are adapted to protrude through the slots 285 and to swing therein so that one side wall rocks about the other into a position at right angles to each other and are held in such position by the prongs 284 in these slots 285. A similar construction at each of the other corners thus provides a rigid cabinet structure of separable members.

The end walls are formed by sunken end members 286 similar to that already described hereinbefore, and are held in place by means of the grid works 287, 288 and 289 and 290 in a manner already described in detail. In order further to insure a tight face-to-face contact between the flange member of the sunken end with the adjacent walls, the spring members 291 and 292, secured to the top face of the sunken end 286 by prongs are provided with V shaped ends 293 of a spring-like property. The grid work 289 is bent about its perforated edge in a manner already described and turned into the space between the springy edges 293 and the sides of the cabinet. After it has been moved into place, it is rigidly held there by springs 293 in a manner shown in Figure 23.

Figure 25:
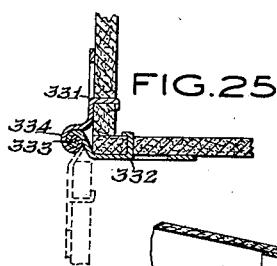
Figure 25 is a cross section through 25—25 of Figure 24.
Figure 27:
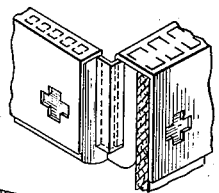
Figures 27 and 28 are details of a modification of Figure 13.

A further form of cabinet structure is illustrated in Figures 24 and 25 in which are shown the two metallic members 331 and 332 suitably secured along the edges of the wall sections and each having a free edge curled as shown at 333 and 334 in such a manner that when the ends are brought into engagement with each other and the walls turned to a right angle position with respect to each other, the ends will provide engaging sockets comprising a hinge structure as shown in detail in Figure 25 in section, and will hold the walls in rigid right angular relation to each other.

In order even more rigidly to connect adjacent walls and in order to provide a rigid and tight connection for holding the front tongue 23 in place in its vertical position, the tongues 91 and 92 (Figure 13), preferably of metal or stiff cardboard, are turned at right angles to the plane of U shaped member 89 prior to turning the members 34 and 35 in, and are interposed between the faces of tongues 26 and 24 and side walls 2 and 4 respectively, so that when the members 34 and 35 are turned about their grid work, they will envelope these tongues as well as the side walls and maintain the sunken end in assembled rigid relation, as shown in detail in Figure 6.

It will be understood that in describing the modification shown in Figure 6, the sunken end member of Figure 14 was employed for purposes of clarity because it was shown in full, although these two forms are modifications of each other. The structure shown in Figure 6 is not provided with slots 31 and 32, as they are unnecessary for this modification, but are employed in connection with another form of corner securing means shown in Figures 1 and 2.

Although the members 91 and 92 (Figure 13) are shown and described as seated between the tongues of the sunken end and the respective side walls of the cabinet, it should be noted that alternatively they may be placed on the inside of the sunken end tongue and directly engaged by the turned over members 34 and 35.

Moreover, members 91 and 92 may be integral extensions of U member 89, or they may be one or two members inserted in the U member 89, with protruding portions at each end bendable into a right angle leg to be engaged with the members 34 and 35.

Figure 28:
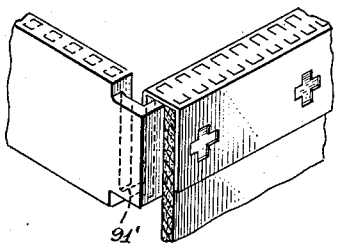

In a further modification, members 91 and 92 may comprise integral extensions of the sunken end tongue 90 as shown in Figure 28. In these latter modifications, U shaped member 89 may be eliminated if desired.

In all of these forms, the corners of the sunken ends and the walls of the container are tightly united by the members 91 and 92 into a rigid angle, the two edges forming the corner being in effect united as if they were an integral formation.

All of these forms serve to connect and integrate adjacent walls in a collapsible structure although they may readily be used even in manufactured structures.

In a still further modification, I may employ the angle wires disclosed in the above identified application or in my application Serial Number 690,360 of which this application is a continuation in part. In such a modification shown in Figures 7–12 inclusive, one leg 48' of the angle is secured in the U shaped member 50, preferably along its upper edge, and the other leg 48 is secured by member 49 also along its upper edge. It will be understood that member 49 is bent into place after leg 48 has been properly positioned.

Although I have, for purposes of illustration, shown one form of sunken end member (Figure 14), it will now be clear that I may use other forms shown in my application Serial Number 693,841 referred to above, such as structures in which the main blank is of thin material supported by a center piece of greater rigidity.

In the use of this cabinet as a moth preventive container, tightness and imperviousness is essential. To further insure these characteristics for my cabinet, I may make the tongue 25 (Figure 14) coextensive with the metal 28' and bendable therewith into engagement with the side walls as illustrated at 40' Figure 29. The side walls at 50' of the cabinet as shown in Figure 29 is similarly made coextensive with the member 35 (Figure 1) to engage the sunken end and the members 91 and 92 being integral extensions of the flap 90, (Figures 6, 21, 25, 26, 27), all together form edges which are closed and substantially impervious. Alternatively, members 28' (Figure 14) may be replaced by the integral extension of flap 25 Figure 30, which is provided with a tape 25' for securing the turned in extension to the side walls and similarly the member 35 may be replaced by the integral extensions of the side walls, the latter provided with a tape for securing the turned in integral extension to the inside face of the sunken end as shown in Figure 31. Moreover, the metal member of both the sunken end and cabinet walls may be replaced by tape for securing the sunken end member in place.

In Figure 13, tongues 91 and 92 are shown and described for providing a rigid connection between adjacent walls. An alternative form is shown in Figure 15. As shown here, the guide loops or straps 36 (Figure 2) are stamped from the outer face of the metallic member 35. These straps, shown in detail in Figure 15 and which will be described more fully hereinafter, provide a space with the face 42 of U shaped metal clamp 35 sufficient to permit the longer leg 37 of angle member 33 (Figure 2) to be slipped into the space and locked in place by the lugs 37' punched from the member 33, which snap into place after being forced through the strap. The opposite end of member 33 has a reentrant projecting shorter leg 38 which slips into the slots 31 and 32 (Figure 14) in the U shaped member 27, as shown in Figure 2, and rigidly secures the side and front walls to each other, as shown in the assembly of Figure 1.

Although slots 31 and 32 are described and shown as extending through the metal and flap, the slot may extend for just a sufficient depth to provide a socket for the reentrant portion of the leg as shown at 27' Figure 32. Moreover, to further insure imperviousness to the cabinet, the slots or sockets 31 and 32 may be entirely eliminated and straps may be formed in the member 44 similar to straps 36, and lugs formed in the leg 47 similar to lug 37' for engaging and securing the second leg. It will also be obvious that the lugs 37' may be formed in the straps and arranged to slip into a depression in the angle member.

Although this is described as a modification of the structure shown in Figure 13, it will be understood that where greater rigidity and imperviousness are desired, both the members 91 and 92 of Figure 13 and the angle member 33 of Figure 2 may be used together.

In Figures 15, 16 and 17 I have disclosed in detail the construction of the straps 35 of Figure 5. As shown in these figures, the strap is formed by slitting the material 260 along the line 261 and at right angles to line 261 as at 262 and by stamping the metal along the slit 262 to form the shoulder 263 and the strap 36. The metal is so formed that the distance between the beginning of the raised portion, as at 264, and its corresponding portion at the opposite end of the slitted member, as at 265 in Figure 15, is spaced further apart than the point 266 at the beginning of the slit and its corresponding point at the opposite end of the strap as at 267, Figure 15. The result is that a truncated cone or funnel is formed at the entrance to the space formed by the strap 261 for guiding the member 37 into place.

The shoulders 263 increase the strength of the weakened material at the slit against any shearing action by the member 37, due to twisting or sidewise motion thereof in response to strains on the cabinet. In actual practice, it was found that the member 37, though made of very much heavier gauge metal, tended to yield and become distorted in shape before the shoulder gave way when an edgewise shearing strain was applied to the heavier gauge part.

Figure 18:
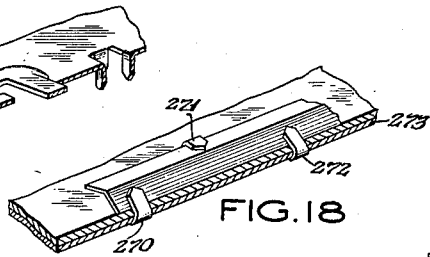
Figure 18 is a detail of a novel form for anchoring metallic members on the walls of a fibrous material.
Figure 20:
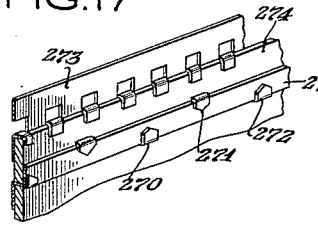
Figure 20 is a perspective view showing the arrangement of the parts of the metallic members mounted in this manner.
Figure 19:
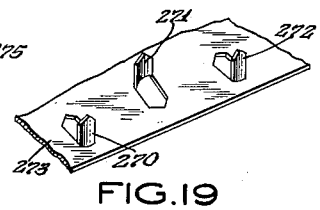
Figure 19 is a detail of the metallic member to be mounted in the manner shown in Figure 18.

In Figures 19 and 20 I have illustrated a modified form of prong operation for securing purposes. As shown, prongs 270, 271 and 272 are punched for alternate positions from the metal 273 and placed as shown in Figure 20 to one side of the material 274 to which it is to be secured. A support 275, preferably of metal, although any other material may be used, of proper width is placed on the opposite side of the member 274 and in proper relation to the prongs so that when the prongs are pressed through the metal and bent in the punching operation, they engage the opposite side of the member 275 as shown in Figure 20. An alternative form of the member 275 is shown in Figure 18. This prong construction may be employed in connection with the grid work structure for securing it to the walls. The grid work may also be secured to the walls in an alternative method by cutting the material at the grid work and stamping the slotted material of the grid work into the walls of the container for securing the reinforcing member thereto.

Figure 26:
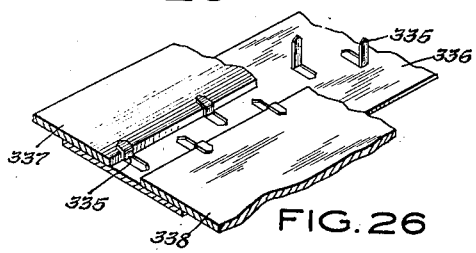
Figure 26 is a further modified form for anchoring members to the walls of my preferred cabinet.

In Figure 26 I have shown a modified construction for providing a securing edge anchor for joining two sheets or walls. As here shown, prongs 335 are punched from metal members 336 in such a manner that as they are turned outwardly from the punched section, they are adapted to engage members 337 and 338. This principle may be employed to provide any desired support means or for the mounting of the various handles described in my application. The slots formed by the prongs, suitably spaced, provide a predetermined bending line.

Figure 33:
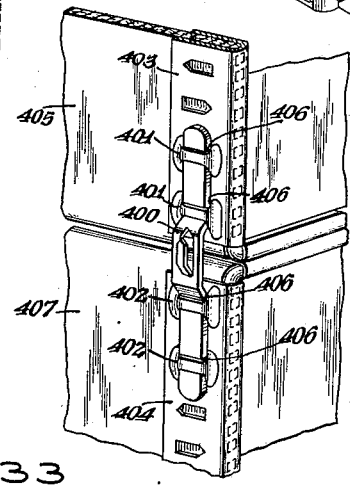
Figure 33 is a view in perspective showing an adjacent wall connection between two walls of adjacent but separate structures.

Each of the forms hereinbefore described serve therefore a particular utility in connection with collapsible structures for the purpose of connecting or integrating adjacent walls. As has been pointed out, the use of such forms need not necessarily be limited to collapsible structures but they may also be used in manufactured structures as well. Nor is the function of the particular constructions herein described limited to connection of adjacent walls in the same structure, but they may be applied as well to connecting adjacent walls of adjacent structures, that is where side walls, for instance, of superposed cabinets extends in the same planes, the walls may be connected as shown in Figure 33. The construction shown in Figure 33 is a modification of the form of interlocking device disclosed in my copending application Serial No. 693,841 and also in my copending application Serial No. 254,178 wherein an interlocking member 400 is inserted in the straps 401, 401 and 402, 402 of the vertically adjacent reinforcements 403, 404 of vertically adjacent cabinets 405 and 407.

The construction of the interlock member 400 of Figure 33 and of the straps 401 thereof is similar in many aspects to that of the disclosures of the interlock in the above identified copending applications as well as in the copending application Serial No. 45,714. The structure of Figure 33 shows, however, the application of the formation of the shoulders 263 of Figure 17 to the straps 401 for the purpose of preventing any slight movement of the interlock bar 400 from shearing the straps 401 away from their associated reinforcement 403.

That is, the curved shoulder formation 406, 406 of the straps 401 and 402 serves to provide a more rigid abutment for the ends of the interlocking bars in the event that such an interlocking bar should be subjected to a slight lateral shearing motion as, for instance, by any force which tends to slide one cabinet horizontally with respect to the other.

While I have shown various ways in which the connection of adjacent walls may be accomplished, I prefer to be limited not by the disclosures herein contained, but only by the appended claim.

What I claim is:

A means for connecting adjacent walls of adjacent containers, said walls extending in the same plane; one of said walls comprising a metallic member having a flat strap formed from the material of said metal, lying in a plane spaced from and parallel to said last mentioned wall, and shoulders on opposite sides of said strap at each end thereof integrally connecting said strap and said member; said strap being arranged to receive a second flat metallic member connected with said other adjacent wall; said shoulders being substantially wider than said strap and arranged to resist transverse shearing stresses of said flat metallic member against the connection between said strap and said first metallic member; the wall from which said strap is formed having tongue portions extending between oppositely facing shoulders.

PHILIP ZALKIND.